Aug. 4, 1970         R. T. ADAMS         3,522,535
MOTION DETERMINATOR HAVING A LIGHT SOURCE, A SHUTTER HAVING
A PLURALITY OF APERTURES AND LIGHT RESPONSIVE
PHOTORESISTORS
Filed Sept. 30, 1965
SUBSTITUTE FOR MISSING XR
2 Sheets-Sheet 1
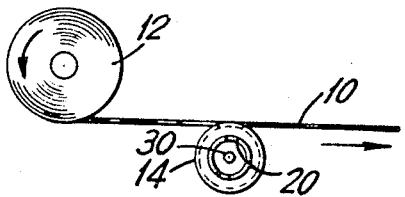
FIG.1a
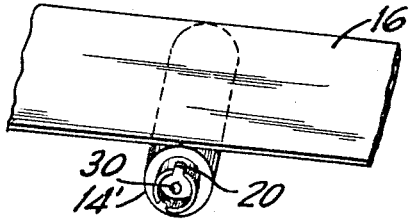
FIG.1b
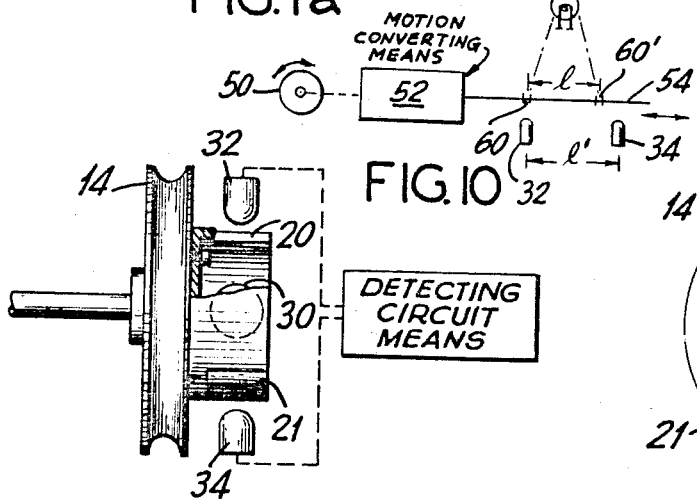
FIG.10
FIG. 2
FIG.3a
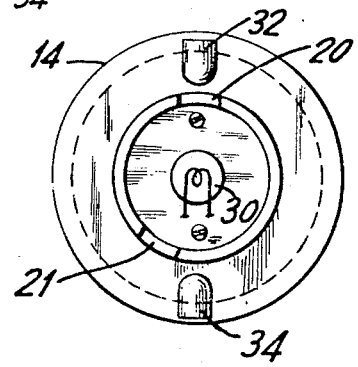
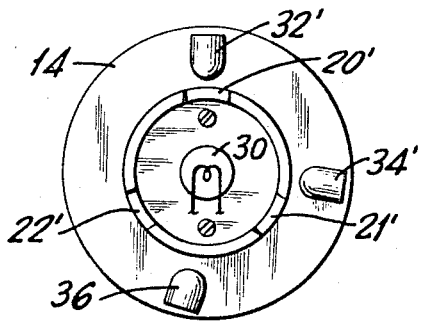
FIG.3b
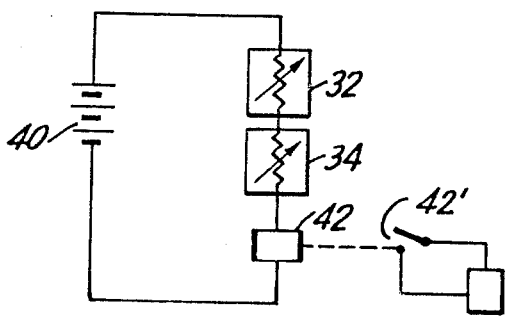
FIG. 7
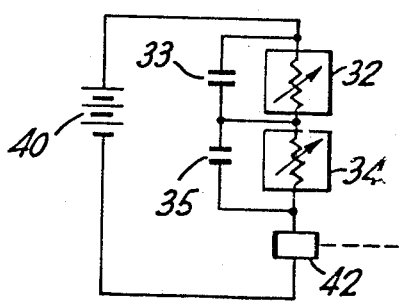
FIG. 9
INVENTOR.
ROBERT T. ADAMS
BY
Hopgood & Calimafde
ATTORNEYS.

Aug. 4, 1970

R. T. ADAMS 3,522,535

MOTION DETERMINATOR HAVING A LIGHT SOURCE, A SHUTTER HAVING
A PLURALITY OF APERTURES AND LIGHT RESPONSIVE
PHOTORESISTORS

Filed Sept. 30, 1965

INVENTOR.
ROBERT T. ADAMS

BY
*Hopgood & Calimafde*
ATTORNEYS.

United States Patent Office 3,522,535
Patented Aug. 4, 1970

3,522,535
MOTION DETERMINATOR HAVING A LIGHT SOURCE, A SHUTTER HAVING A PLURALITY OF APERTURES AND LIGHT RESPONSIVE PHOTORESISTORS
Robert T. Adams, Short Hills, N.J., assignor to Sichak Associates, Nutley, N.J., a corporation of New Jersey
Filed Sept. 30, 1965, Ser. No. 491,613
Int. Cl. G04f 9/00
U.S. Cl. 324—18                          13 Claims

ABSTRACT OF THE DISCLOSURE

This invention relates to a motion determinator using a light source. A motion is coupled to a shutter having at least two apertures. At least two series connected photoresistors are connected in series and positioned to receive light passing through the respective apertures. The apertures of the shutter and the resistors are spaced so that both resistors cannot be illuminated simultaneously. A control device detects a condition of the resistors when light fails to illuminate both of said photoresistors.

---

This invention relates to a motion detector and more particularly for providing an indication of the duration of time a selected object is moving over an idler pulley.

In determining the time that wire is drawn or a conveyer belt is moved, it is desirable to employ a simple, inexpensive, error-free, time measuring device.

For example, if the time that wire is drawn is measured by determining the time that a drive motor is rotating, an error may be introduced because the motor may be decoupled from the system. Further, length of movement determination is also inaccurate because of irregular speeds.

While each problem can be solved with complicated apparatus, it is a prime object of this invention to provide a simple, inexpensive and reliable means for determining the duration of motion of moving object.

Briefly, this object is fulfilled by providing an apparatus for measuring the motion time of an idler over which the moving object passes. A shutter having spaced apertures is coupled for movement with said idler. Photoresistors having sluggish response characteristics are connected in circuit such that when both have low resistance states, a clock is turned on. A light source is connected so that the shutter obstructs the light path to the photoresistors. However, the photoresistors are physically spaced with respect to the shutter openings so that the photoresistors cannot be simultaneously illuminated. Their time constant prevents rapid resistance build-up of a photoresistor before illumination decreases its conductivity again.

While motion duration is a prime object of this invention, other control functions may be carried out within the embodiments claimed depending on an indication of motion stoppage.

Other objects and various further features of novelty and invention will be pointed out or will occur to those skilled in the art from a reading of the following specification in conjunction with the accompanying drawing. In said drawing, which shows, for illustrative purposes only, a preferred form of the invention:

FIG. 1a is a schematic drawing of a wire being pulled over an idler to which this motion detector invention is coupled;

FIG. 1b is a schematic drawing similar to FIG. 1a in which a conveyor belt is driven over an idler to which this motion detector invention is coupled;

FIG. 2 is a side view showing the motion detector coupled to the idler;

FIG. 3a is a front view of the motion detector shutter and light system;

FIG. 3b is a view similar to FIG. 3a of an alternative shutter and light system using three photocells and three shutter openings;

FIG. 6b is an alternative embodiment of FIG. 6a;

FIG. 7 is a circuit diagram of the elements of my invention using two photocells;

FIG. 8b is a circuit diagram for the corresponding parts of FIG. 8a;

FIG. 9 is a circuit diagram illustrating the use of capacitors in an embodiment of my invention; and FIG. 10 is a schematic diagram of an alternate embodiment using a reciprocating shutter.

Figure 4A:
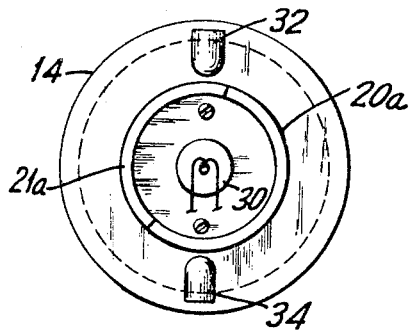
FIGS. 4a and 4b are schematic diagrams of the invention using cut-away drum shutters.

Referring now to the drawings, there are disclosed in FIGS. 1a and 1b, two alternative objects for which the duration of motion is to be determined. In FIG. 1a a wire is pulled from a reel 12 over an idler 14. The driving mechanism is not part of the invention and is not otherwise disclosed except by the rightward facing arrow. In FIG. 1b, a conveyer belt 16 is diagrammatically shown as being driven in a similar rightward direction over an idler 14'. The shutter 20 which forms part of this invention and is explained more fully later is shown for illustrative purposes as being coupled to the rotation of idlers 14 and 14'.

It will be understood that the selections of a continuous wire and a conveyor belt to illustrate the applications of this invention were as examples only; the simplicity of this invention will find many applications.

Referring to FIGS. 2 and 3a, this invention includes a shutter 20, a light source 30, a plurality of photosensitive resistors 32, 34 having a pronounced sluggish return characteristic (long return time constant) in an electrical circuit (FIG. 7) having a power source 40 actuating a relay 42 controlling contacts 42' of an indicating or alarm circuit depending upon the conditions of the photosensitive resistors. The shutter 20 is coupled for rotation to the idler 14. The means for attaching this shutter is a matter of convenience depending upon the particular application; however the shutter may be attached to the idler or the idler shaft.

Shutter 20 comprises a generally cylindrical shell-like member (FIG. 1b) which may be conveniently rotated. The shutter has two spaced apart apertures 20 and 21 (FIG. 3a), the spacing and width of which are correlated with the spacing and size of photosensitive resistors 32, 34. As shown in the example of FIGS. 2 and 3a, if the photosensitive resistors 32 and 34 are mounted 180° apart and adjacent to the rotational path of the shutter, then the shutter openings 20 and 21 must be spaced apart by some angle somewhat greater or less than 180° so that when the idler is stationary, it will be impossible for light to pass through both shutter apertures. If the physical dimensions of the photoresistor are such as to receive a 5-10° light scan angle, then the spacings of the shutter openings should be somewhat less than 170° or somewhat greater than 190° (which is essentially the same angle).

It is not necessary to limit the invention to the use of only two photoresistors and in FIG. 3b it is suggested that three such photoresistors 32', 34' and 36' may be used and either the photoresistors or the apertures 20', 21', 22' may be spaced apart 120°. Here, three shutter openings 20', 21', 22' will be spaced apart at angles of 120°, but the photocells are spaced apart at angles somewhat less than 120° so as to insure that not all photoresistors can be exposed at one time. This arrangement indicates that one or two, but not three or all, of the photoresistors may be exposed at one time.

It will be understood that when more than two photoresistors are used, the circuitry of FIG. 7 or 9 may be used in which the plural resistors are placed in series.

A light source such as bulb 30 may be mounted concentric or within the shutter, the shutter obstructing the path of the illumination.

If the idler is at rest, it will be apparent that only one of the photoresistors will be exposed. During normal operation such photoresistor will be intermittently exposed. Each photoresistor is a CdS (cadmium sulphide) cell having a resistance characteristic that decreases markedly when exposed to light but has a sluggish response or a long time constant when light is removed to restore its resistance to normal. This sluggish response is utilized in this invention. As one example of a commercially available CdS cell which meets the requisites of this invention, reference is made to the 905L, a multi-slit cell, sold by Clairex, 8 W. 30th St., New York City. In the cell the cadmium sulphide is covered by a multi-slit screen and requires a predetermined time (the time constant) after illumination before the resistance is restored to a predetermined level (which may be below maximum).

Referring to the circuit of FIG. 7, a power source such as a DC battery 40 is connected in series with photoresistors 32 and 34. When only one photoresistor has been actuated (exposed to light) the resistance of the other photoresistor will be sufficient to prevent the energization of the series relay 42. That is, threshold relay 42 is set such that both of the photoresistors must be at a low resistance state to initiate it. Each photoresistor may be considered to have a "threshold" resistance level after being illuminated such that its resistance value is low enough that the current flow is suffcient to keep the relay energized.

During normal operation the decrease in resistance of both photoresistors 32, 34 simultaneously causes the relay to pick up. Although each photoresistor is exposed intermittently, because of its long time constant, its resistance will not have been restored to a sufficient level before the next exposure so as to change the position of the relay. At any given instant one photoresistor is low because it is lighted and the other is simultaneously low because it has not recovered from being recently lighted. As long as the photoresistors are alternatively lighted oftener than their recovery time, both cells will be permanently low resistance, thus operating and holding relay 42. That is, the amount and rate of illumination is sufficient to keep the resistance below "threshold."

Once relay 42 picks up, it closes associated contacts 42' (FIG. 7) to initiate a clock or other duration indicator which may be coupled to a recorder, punch system or any other conventional type of device. While relay 42 is shown as being energized, it may also be de-energized if the circuit is so designed. In essence, the relay 42 is actuated to provide a control function which may have many desired ultimate uses.

Figure 4B:
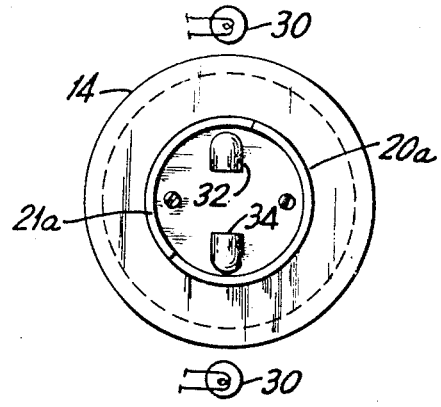

In the embodiment of FIG. 4a, the shutter 20a has the general shell or drum shape as that in FIG. 1b except that only a single opening or slot 21a exists. Slot 21a extends somewhat less than 180°, being reduced by the width of one photoresistor. In this single slot shutter, the photoresistors 32 and 34 are spaced such that only one photoresistor can be exposed at the same time. In FIG. 4b, two light sources 30 and 30' are shown outside of the shutter with two photocells 32, 34 shielded by and within the shutter. In FIGS. 4a and 4b, the slot 21a allows only one photocell to receive light at one time.

In general, various devices may be used to allow light to reach a photocell and the term "shutter" is not intended to be limited to the cylindrical shell previously described. For example, in FIG. 5, there is shown a rotating disc segment 50 coupled for rotation with the pulley or the driven member 14. The light source 30 is positioned to the left of the segment 50 preferably along the axis thereof and directs light to the disc. The photocells 32 and 34 are spaced apart on the opposite side of the disc so that both cannot be illuminated simultaneously. It is understood that the light source in FIG. 5 or in other embodiments may use lenses to focus or direct the light rays, hoods or other means to insure that the light rays are effectively utilized.

Figure 5:
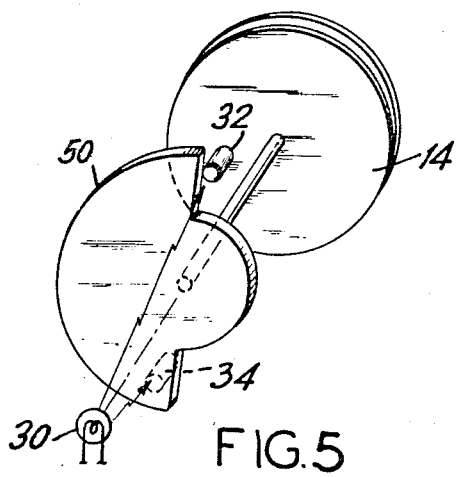
FIG. 5 is a schematic diagram of the invention using a disc shutter.
Figure 8A:
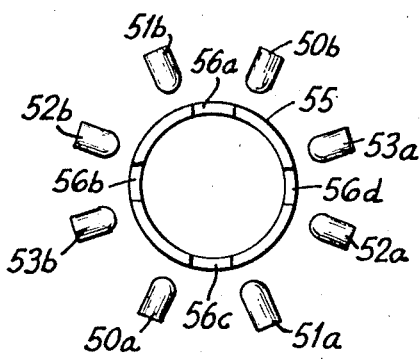
FIG. 8a is a diagram of an alternate embodiment of my invention using a plurality of photocells.
Figure 8B:
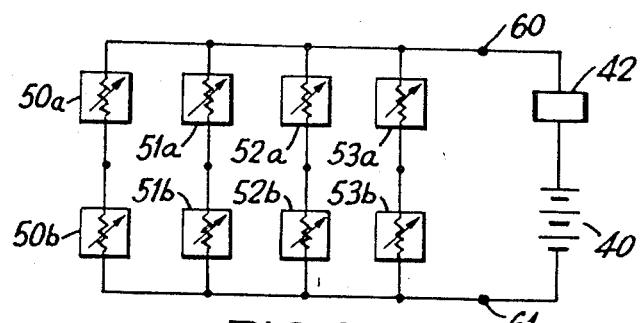

While the embodiments of FIGS. 4a, 4b and 5 have employed a single shutter opening, it will be recognized that multiple shutter apertures, and multiple arrays of light sources and photocells may be contemplated. As illustrated in FIGS. 8a and 8b, the shutter 55 has a plurality of apertures 56a–56d and a plurality of pairs of photocells 50a, b . . . 53a, b. In the "rest position" light cannot strike all of the photocells. The energization of relay 42 depends upon the resistance seen at terminals 60 and 61, which is at a minimum when each of photocells 50a . . . 53b has been exposed to light and in the low resistance state.

FIG. 3b and FIG. 8a are basically equivalent, except FIG. 3b uses a single series arrangement of photoresistors (like FIG. 7 or FIG. 9) while FIG. 8a uses parallel sets of series pairs per FIG. 8b. The difference is that FIG. 3b can uncover all but one photoresistor, while the FIG. 8a embodiment may only uncover all but one of the photoresistors in each branch of the circuit (FIG. 8b).

The use of more than one shutter opening has the advantage of increasing the "flicker rate" for a given r.p.m. of the pulley. The use of at least two shutter leaves, allows the shutter to be symmetrical (avoids unbalance). However, since each opaque section is a fixed amount ($\Delta$=aperture width) wider than the clear section, the total light reaching the cells is decreased by the use of larger numbers of apertures. Thus for detection of low rotation rates, multi-aperture shutters have an advantage. Other techniques for slow rates involve increasing recovery time constants by selection of components or by adding capacitors 33 and 35 across each cell, as illustrated in FIG. 9.

Many circuit variations, even in the interconnection of the elements of FIG. 8b, will occur to those skilled in the art. Further varitions in aperture size, spacing, lens system, and component selections, depending upon recovery time constant, will be apparent.

Figure 6B:
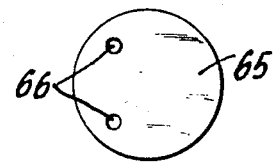
Figure 6A:
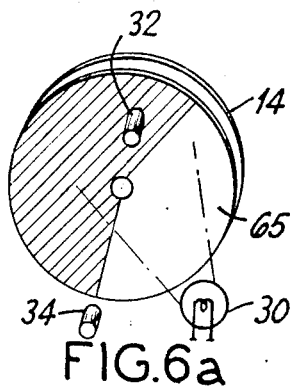
FIG. 6a is a schematic diagram of an alternative disc shutter embodiment.

As one illustration, in FIG. 6a light is reflected from a shutter 65 onto the photoresistors 32 and 34. The light source 30 is oriented in front of the shutter so that the reflected light will strike the photoresistors. Shutter 65 comprises a reflective surface covering or mounted for synchronous movement with the pulley 14. If the pulley is simply painted slightly less than half-white and slightly more than half-black, as suggested in FIG. 6a, a different amount of light is reflected from respective half-sections. If the paint is silvered or made reflective, the effect is enhanced. The photocells 32, 34 are oriented in accordance with principles previously described so that both cannot be brightly illuminated simultaneously. In the embodiment disclosed, the photocells are 180° apart, and the light or reflective section of the pulley which allows light to impinge upon photocells 32 and 34 covers less than 180°. The reflective surface thus becomes the shutter aperture and a plurality of such apertures may be formed by providing a pattern of white and black bands.

In FIG. 6b, the holes 66 in the pulley 65 comprise the apertures, and these holes are spaced out of alignment with both photoresistors or at different angular positions, so that only one photoresistors senses light from one hole and both photoresistors cannot be exposed at a rest position.

Further, while the shutter movement as illustrated is rotational, coupling devices or other mechanical arrangements can convert such movement to oscillating rectilinear motion, in which case the photocells and apertures can be aligned along a straight line with the prerequisite that at rest, all of the photocells cannot be illuminated. Further, the moving parts of the motion device itself, holes in a conveyer belt, links in a chain, or white and black reflective spots on a shaft or idler, may constitute the shutter.

In FIG. 10, the rotary idler motion may be converted to reciprocation motion of a piston-like member moving a shutter, which may assume any one of many forms. The shutter may be any form of elongated member having holes, painted bands, cut-out sections, or other type of light-varying means.

In FIG. 10, the moving means 50 is shown as a member which may rotate in one direction continuously or oscillate back and forth. Further, any moving means may be contemplated in conjunction with a motion converting means 52. Means 52 may be a gear train, or a rack or other toothed member driving a gear train if the moving means moves in a straight path.

The motion converting means 52 converts the motion to rectilinear oscillations of a shutter 54 which, for simplicity of illustration, is shown separate from the converting means 52. As an example, if the moving means 50 is a motor, the motion converting means could be a drive rod attached to the piston.

The shutter 54 will have at least two apertures 60 spaced at a distance. Positioned on one side of the shutter is the light source 30. On the opposite side of shutter 54 are photocells 32 spaced at a distance l' which is greater or less than l by at least the effective diameter of apertures 60, 60'. As the shutter oscillates, the photocells are intermittently exposed. The photocells may be connected in a circuit illustrated in FIG. 7 or any other circuit contemplated by this invention.

Other forms of shutters are contemplated, such as the reflective bands, painted, silvered or highly polished, slots, single or multiple holes. The shutter must have the characteristic of selectively passing light or reflecting light onto a photosensitive device, and it will be noted that other types of shutter elements are contemplated.

It will be understood that there has been disclosed a device for measuring motion duration which is simple and inexpensive to build. It is capable of responsive to very high speeds without being concerned with revolution counting, vibration counting or other mechanical time indicating means. Moreover, it is easily mounted, removed and repaired. Suitable provisions may be incorporated to indicate a failure of the light source or clock. While the light source has been shown as mounted within the shutter, reversal of the light and light sensitive elements is within the scope of this invention.

Finally, while the aspect of intermittently opening the shutter to apply light to two respective photoresistors which cannot receive light simultaneously has been illustrated as the best embodiment, other shutters such as multiple leaf shutters, oscillating shutters, and other eccentric shutters may be employed as in accordance with the basic principle heretofore disclosed.

What is claimed is:

1. An apparatus for measuring the duration of rotation of a shaft comprising:
    shutter means coupled to said shaft having at least one aperture, whereby said shutter is rotated when said shaft rotates,
    a light source,
    at least two fixedly located photoresistors having a relatively long time constant, whereby the resistance of said photoresistors decreases upon application of light but requires a relatively long time after removal of light to regain normal resistance,
    said photoresistors and said apertures being positioned so that the photoresistors avoid simultaneous illumination;
    a control relay;
    a power source for said relay;
    means responsive to the energization of said relay to initiate an indicating means;
    said power source, relay and photoresistors being connected in series circuit,
    said power source initiating said relay only when both of said photoresistors have decreased resistance conditions.

2. The apparatus of claim 1 in which the time constant is related to the speed of rotation and number of apertures to insure sufficient illumination to prevent the resistance of the photoresistors from reaching their relatively higher values while said shaft is rotating.

3. The apparatus of claim 1 in which said photoresistors are spaced a predetermined number of degrees apart and said apertures are spaced a different predetermined number of degrees apart.

4. The apparatus of claim 3 in which the photoresistors are spaced approximately 180° apart and the apertures are spaced at angles less than 180° apart.

5. The apparatus of claim 1 including means coupled to said photoresistors to vary the effective time constant thereof.

6. The apparatus of claim 1 including capacitance means coupled to said photoresistors to control the time of return to the higher resistance state.

7. An apparatus for measuring the duration of motion of an object over an idler comprising:
    shutter means having at least two spaced apertures, said shutter means being mounted for rotation in accordance with rotation of said idler,
    a light source means,
    said shutter obstructing the illumination from said light source,
    at least two photoresistors having a relatively long return time constant, whereby the resistance of said photoresistors decreases upon application of light but requires a relatively long time after removal of light to regain normal resistance,
    means coupled to said photoresistors to control said time constant;
    said photoresistors and said apertures being relatively positioned so that the photoresistors cannot be simultaneously illuminated;
    a power source,
    a threshold means,
    clock means responsive to the energization of said threshold means to initiate a duration indication;
    said power source, threshold means and photoresistors being connected in series circuit,
    said power source initiating said threshold means only when both of said photoresistors have decreased resistance characteristics such that the resistance presented to the power source provides a signal higher than threshold.

8. The apparatus of claim 7 in which each of said photoresistors is a cadmium sulphide cell.

9. An apparatus for determining motion of an object over a rotating device comprising:
    shutter means having at least one aperture,
    said shutter means being coupled for movement in accordance with said rotating device,
    a light source illuminating said shutter means,
    circuit means including at least two series connected photoresistors positioned to receive illumination through said shutter and having relatively long time constants, whereby the resistance of said photoresistors decreases upon application of light but requires a relatively long time after removal of light to regain normal resistance,
    said photoresistors and said shutter means including said aperture being positioned so that the photoresistors avoid simultaneous illumination,
circuit means including a power source,
a relay,
and control means responsive to the energization of said relay,
said power source, relay and photoresistors being connected in series circuit,
said power source initiating said relay only when both of said photoresistors have decreased resistance characteristics,
the amount and rate of illumination being sufficient to keep the series resistance of said photoresistors below a predetermined threshold level depending on the values of the power source and threshold level of the relay.

10. The apparatus of claim 9 in which said shutter comprises a shell-like drum section having at least one axial slit defining the aforesaid aperture.

11. The apparatus of claim 9 in which said shutter comprises a disc having aperture segments.

12. The apparatus of claim 9 in which said shutter comprises bands of relatively opaque and reflective sections.

13. An apparatus for determining motion of an object over a rotating means comprising:
shutter means having at least two apertures,
said shutter means being moved in accordance with said rotating means,
a light source,
circuit means including at least two series connected photoresistors, each photoresistor having a long return time constant, whereby the resistance of said photoresistors decreases upon application of light but requires a relatively long time after removal of light to regain normal resistance,
said shutter means mounted between said light source and said photoresistors,
said photoresistors and said apertures being positioned so that the photoresistors cannot be simultaneously illuminated,
and means responsive to a predetermined resistance value of said photoresistors to provide a control signal,
said circuit means includes a duration indicating means.

References Cited
UNITED STATES PATENTS

| | | | |
|---|---|---|---|
| 2,263,228 | 11/1941 | Wolff | 250—231 |
| 3,128,386 | 4/1964 | Hughes | 340—271 |
| 3,222,529 | 12/1965 | Askowith | 250—209 |
| 3,231,807 | 1/1966 | Willis | 250—233 |
| 3,270,206 | 8/1966 | Kazan | 250—209 |

RUDOLPH V. ROLINEC, Primary Examiner

M. J. LYNCH, Assistant Examiner

U.S. Cl. X.R.

317—5, 127; 340—263; 324—161